US012812483B2

(12) United States Patent
Basu Mallick et al.

(10) Patent No.: US 12,812,483 B2
(45) Date of Patent: Nov. 24, 2026

(54) SLICE INFORMATION FOR SERVING AND NEIGHBOR CELLS

(71) Applicant: Lenovo (Singapore) Pte. Ltd., New Tech Park (SG)

(72) Inventors: Prateek Basu Mallick, Dreieich (DE); Joachim Löhr, Wiesbaden (DE); Hyung-Nam Choi, Ottobrunn (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 304 days.

(21) Appl. No.: 18/695,315

(22) PCT Filed: Sep. 26, 2022

(86) PCT No.: PCT/IB2022/059140
§ 371 (c)(1),
(2) Date: Mar. 25, 2024

(87) PCT Pub. No.: WO2023/047378
PCT Pub. Date: Mar. 30, 2023

(65) Prior Publication Data

US 2025/0008390 A1 Jan. 2, 2025

Related U.S. Application Data

(60) Provisional application No. 63/248,362, filed on Sep. 24, 2021.

(51) Int. Cl.
*H04W 36/00* (2009.01)

(52) U.S. Cl.
CPC ................................ *H04W 36/0072* (2013.01)

(58) Field of Classification Search
CPC ..... H04W 36/00; H04W 76/20; H04W 76/30; H04W 64/00; H04W 24/10;
(Continued)

(56) References Cited

U.S. PATENT DOCUMENTS

2020/0344816 A1 10/2020 Sha et al.
2023/0056855 A1 * 2/2023 Jiang .................. H04W 36/302
(Continued)

FOREIGN PATENT DOCUMENTS

CN 110022583 A 7/2019
WO 2021146852 A1 7/2021

OTHER PUBLICATIONS

PCT/IB2022/059140, "Notification of Transmittal of the International Search Report and the Written Opinion of the International Searching Authority, or the Declaration", International Searching Authority, Dec. 22, 2022, pp. 1-12.
(Continued)

*Primary Examiner* — Iqbal Zaidi
(74) *Attorney, Agent, or Firm* — Kunzler Needham Hilton

(57) ABSTRACT

Apparatuses, methods, and systems are disclosed for indicating network slice support for serving and neighbor cells. One apparatus include a memory coupled to a processor, the processor configured to determine a configuration of neighboring cells, determine slice information for a serving cell and the neighboring cells, and broadcast the slice information in the serving cell using an indexing scheme to signal at least the set of carrier frequencies, where the slice information includes an identifier of a respective slice group and a set of carrier frequencies corresponding to the respective slice group.

19 Claims, 12 Drawing Sheets

(58) Field of Classification Search
CPC .............. H04W 36/0061; H04W 36/08; H04L 1/0038; H04L 5/0051
See application file for complete search history.

(56) References Cited

U.S. PATENT DOCUMENTS

| | | | | |
|---|---|---|---|---|
| 2023/0156583 | A1* | 5/2023 | Murray | H04W 48/20 370/329 |
| 2024/0399175 | A1* | 12/2024 | Sheetz | A61N 7/02 |

OTHER PUBLICATIONS

CMCC, "New WID on enhancement of RAN Slicing for NR", 3GPP TSG RAN Meeting #91e RP-210912, Mar. 16-26, 2021, pp. 1-4.

3GPP, "3rd Generation Partnership Project; Technical Specification Group Radio Access Network; NR; Radio Resource Control (RRC) protocol specification (Release 16)", 3GPP TS 38.331 V16.5.0, Jun. 2021, pp. 1-959.

* cited by examiner

```
S-NSSAI ::=        CHOICE{
        Sst                    BIT STRING (SIZE (8)),
        sst-SD                 BIT STRING (SIZE (32))
}
```

```
-- ASN1START
SliceInfo ::=                 SEQUENCE {
      Frequency-List                SEQUENCE (SIZE (1..maxFreq)) OF ARFCN-ValueNR,
      Slice-Info-Neigh              SEQUENCE (SIZE (1..maxFreq)) OF SliceInfoNeighCells,
      SliceInfoNeighCells ::=       SEQUENCE {
          NeighFrequency                  ARFCN-Index,
          same-As-Indication              ARFCN-Index                              OPTIONAL,
          SliceGroup-List-WO-Exception    SEQUENCE (SIZE (1..maxSliceGroup)) OF SliceGroupInfoWO
                                                                                   OPTIONAL,
          SliceGroup-List-with-Exception  SEQUENCE (SIZE (1..maxSliceGroup)) OF SliceGroupInfoWith
                                                                                   OPTIONAL
      }
      SliceGroupInfoWO ::=          SEQUENCE (SIZE (1..maxSliceGroups)) OF INTEGER (0.. maxSliceGroups-1)
      SliceGroupInfoWith ::=        SEQUENCE {
            sliceGroupId                  INTEGER (0.. maxSliceGroups-1),
            exceptionalCellIds            SEQUENCE (SIZE (1..maxExceptionalCells)) OF PhysCellId
      }
      ARFCN-Index ::= INTEGER (0..7)
}

-- ASN1STOP
```

FIG. 6A

```
-- ASN1START

SliceInfo ::=                   SEQUENCE {
      Slice-Info-Neigh                    SEQUENCE (SIZE (1..maxFreq)) OF SliceInfoNeighCells,

      SliceInfoNeighCells ::=             SEQUENCE {
            NeighFrequency                      ARFCN-ValueNR,
            same-As-Indication                  ARFCN-Index                                    OPTIONAL,
            SliceGroup-List-WO-Exception        SEQUENCE (SIZE (1..maxSliceGroup)) OF SliceGroupInfoWO
                                                                                               OPTIONAL,
            SliceGroup-List-with-Exception      SEQUENCE (SIZE (1..maxSliceGroup)) OF SliceGroupInfoWith
                                                                                               OPTIONAL
      }

      SliceGroupInfoWO ::=                SEQUENCE (SIZE (1..maxSliceGroups)) OF INTEGER (0.. maxSliceGroups-1)

      SliceGroupInfoWith ::=              SEQUENCE {
            sliceGroupId                        INTEGER (0.. maxSliceGroups-1),
            exceptionalCellIds                  SEQUENCE (SIZE (1..maxExceptionalCells)) OF PhysCellId
      }

      ARFCN-Index ::=                     INTEGER (0..7)
}

-- ASN1STOP
```

FIG. 6B

```
-- ASN1STAR
SliceInfo ::=                   SEQUENCE (SIZE (1..maxSliceGroup)) OF SliceInfoNeighCells,
SliceInfoNeighCells ::=         SEQUENCE {
      SliceGroupId                    INTEGER (0.. maxSliceGroups-1),
      same-As-Indication              INTEGER (0.. maxSliceGroups-1)                 OPTIONAL,
      Freq-List-WO-Exception          SEQUENCE (SIZE (1..maxFreq)) OF FreqInfoWO     OPTIONAL,
      Freq-List-with-Exception        SEQUENCE (SIZE (1..maxFreq)) OF FreqInfoWith   OPTIONAL
}
FreqInfoWO ::=
      Frequency                 CHOICE {
            NR-Frequency              ARFCN-ValueNR,
            NR-Frequency-index        INTEGER (0.. maxFreq-1)
      },
      FreqPriority ::=          SEQUENCE {
            cellReselectionPriority       CellReselectionPriority,
            cellReselectionSubPriority    CellReselectionSubPriority                 OPTIONAL
      }
}
FreqInfoWith ::=                SEQUENCE {
      Frequency                       CHOICE {
            NR-Frequency                    ARFCN-ValueNR,
            NR-Frequency-index              INTEGER (0.. maxFreq-1)
      },
      FreqPriority ::=                SEQUENCE {
            cellReselectionPriority         CellReselectionPriority,
            cellReselectionSubPriority      CellReselectionSubPriority
      OPTIONAL
      },
      exceptionalCellIds              CHOICE {
            cellId                          CellIdentity,
            cellId-index                    INTEGER (1..maxExceptionalCells)
      }
}
-- ASN1STOP
```

FIG. 7

```
-- ASN1START
SI-RequestConfig::=           SEQUENCE {
    rach-OccasionsSI                SEQUENCE {
        rach-ConfigSI                     RACH-ConfigGeneric,
        ssb-perRACH-Occasion              ENUMERATED {oneEighth, oneFourth, oneHalf, one, two, four,
                                                     eight, sixteen}
    }                                                                          OPTIONAL,   -- Need R
    si-RequestPeriod                      ENUMERATED {one, two, four, six, eight, ten, twelve, sixteen}
                                                                               OPTIONAL,
    sliceInfo-RequestResources            SEQUENCE (SIZE (1..maxSliceGroup)) OF SI-RequestResources
                                                                               OPTIONAL,
    si-RequestResources                   SEQUENCE (SIZE (1..maxSI-Message)) OF SI-RequestResources
}

SI-RequestResources ::=       SEQUENCE {
    ra-PreambleStartIndex           INTEGER (0..63),
    ra-AssociationPeriodIndex       INTEGER (0..15)                            OPTIONAL,   -- Need R
    ra-ssb-OccasionMaskIndex        INTEGER (0..15)                            OPTIONAL    -- Need R
}

-- ASN1STOP
```

FIG. 8

SLICE INFORMATION FOR SERVING AND NEIGHBOR CELLS

CROSS-REFERENCE TO RELATED APPLICATIONS

This application claims priority to U.S. Provisional Patent Application No. 63/248,362 entitled "INDICATING NETWORK SLICE SUPPORT FOR SERVING AND NEIGHBOR CELLS" and filed on 24 Sep. 2021 for Prateek Basu Mallick, Joachim Löhr, Hyung-Nam Choi, and Ravi Kuchibhotla, which application is incorporated herein by reference.

FIELD

The subject matter disclosed herein relates generally to wireless communications and more particularly relates to indicating network slice support for serving and neighbor cells.

BACKGROUND

In Third Generation Partnership Project ("3GPP") systems, network slicing is a network architecture that enables the multiplexing of virtualized and independent logical networks on the same physical network infrastructure. Each network slice is an isolated end-to-end ("E2E") network tailored to fulfil diverse requirements requested by a particular application.

BRIEF SUMMARY

Disclosed are procedures related to indicating network slice support for serving and neighbor cells. Said procedures may be implemented by apparatus, systems, methods, or computer program products.

One method at a network device includes determining a configuration of neighboring cells and determining Slice Information for a serving cell and the neighboring cells, where the Slice Information comprises an identifier of a respective slice group and a set of carrier frequencies corresponding to the respective slice group. The first method includes broadcasting the Slice Information in the serving cell using an indexing scheme to signal at least the set of carrier frequencies.

One method at a User Equipment ("UE") includes receiving first Slice Information from a mobile communication network and determining complete Slice Information from the received first Slice Information. The second method includes performing cell reselection using the complete Slice Information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6A is a diagram illustrating one embodiment of a SliceInfo information element ("IE");

FIG. 6B is a diagram illustrating an alternate embodiment of the SliceInfo IE:

FIG. 7 is a diagram illustrating another embodiment of a SliceInfo IE:

FIG. 8 is a diagram illustrating one embodiment of a SI-RequestConfig IE:

DETAILED DESCRIPTION

Figure 1:
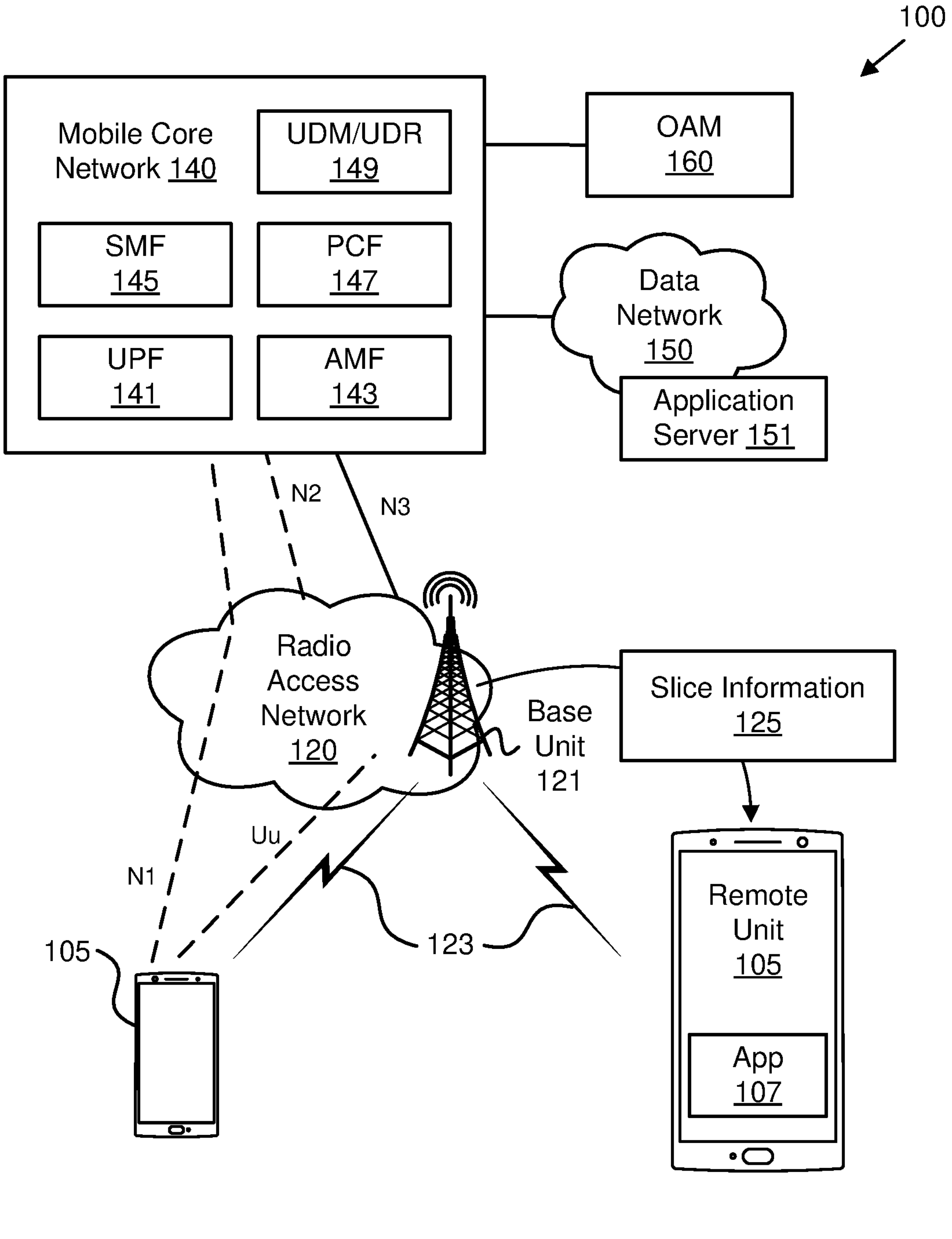
FIG. 1 is a schematic block diagram illustrating one embodiment of a wireless communication system for indicating network slice support for serving and neighbor cells.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including." "comprising." "having." and variations thereof mean "including but not limited to," unless expressly specified otherwise. An enumerated listing of items does not imply that any or all of the items are mutually exclusive, unless expressly specified otherwise. The terms "a." "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for indicating network slice support for serving and neighbor cells. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Network Slice Information (also referred to herein as "Slice Information"), for a single slice or for a slice group, is to be provided to the UE using both broadcast and dedicated signaling are provided for the serving as well as neighboring frequencies. A baseline for the UE's slice-based cell (re) selection behavior (i.e., referring to cell selection and/or cell reselection) in the Access Stratum ("AS") may consist of the following steps:

Step 0: The Non-Access Stratum ("NAS") layer at the UE provides Slice Information to the AS layer at UE, including slice priorities.

Step 1: The AS layer sorts slices in priority order starting with highest priority slice.

Step 2: Select slices in priority order starting with the highest priority slice.

Step 3: For the selected slice assign priority to frequencies received from network.

Step 4: Starting with the highest priority frequency, perform measurements (same as legacy).

Step 5: If the highest ranked cell is suitable (e.g., as defined in 3GPP Technical Specification ("TS") 38.304) and supports the selected slice in step 2, then the UE camps on the cell and exits this sequence of operation.

Step 6: If there are remaining frequencies then go back to step 4.

Step 7: If the end of the slice list has not been reached go back to step 2.

Step 8: Perform legacy cell reselection.

However, existing 3GPP specifications do not explain how the UE is to determine whether the highest ranked cell supports the selected network slice. In a simple art, a cell broadcasts its own network slice support. In this art, the UE measures a frequency and tries to acquire system information of the highest ranked cell and determines if the selected slice (as in Step 2) is supported in the highest ranked cell (or not). Further, it is difficult to assume that slice(s)/slice-group(s) support of a cell can be broadcasted in System Information Block #1 ("SIB1") (to not increase SIB1 size too much), the UE may need to acquire other System Information Block ("SIB") of the neighbor to determine the same. If the highest ranked cell indeed does not support the selected slice, the UE will need to repeat the procedure until the highest ranked cell on some other frequency supports one of the selected slices (down the order). This is not an optimal solution since this involves UE making hit-and-trial on many frequencies/cells and wastes UE battery before it finds a cell that supported the selected slice.

In view of above, solutions for indicating network slice support for serving and neighbor cells are needed for addressing the following issues:

A) Support slice-based cell reselection, specify mechanisms and signaling including to assist cell reselection, broadcast the supported Slice Information of the current cell and neighbor cells, and cell reselection priority per slice in system information message.

B) Support slice-based cell reselection, specify mechanisms and signaling including to assist cell reselection, include Slice Information (with similar information as in System Information ("SI") message) in RRCRelease message.

According to a first solution, an indexing method is used such that repetition of different information elements like frequency, slice, and/or Cell-identity (PCI, CellIdentity) need not consume as many bits as the original information. In a further implementation of the first solution, the first index (i.e., '000') is reserved for the serving frequency. Therefore, the first row of a mapping Table, does not need to be signaled.

In another implementation of the first solution, the first index (i.e., '00000') is reserved for indicating the slice support same as serving cell. So, if frequency F2 also supports the same slice groups (as on serving cell), then frequency F2 indicates slice group as '00000'.

According to a second solution, Slice Information for neighbor cells on each of the slices (slice-group), Slice_i supported on any of the neighboring cell/frequencies is indicated (e.g., in System Information Block #4 ("SIB4") or in RRCRelease message) using some combination of the following three information: a) First, an indication ("same-as-indication") is used for each slice (slice-group): b) Frequency list without exception; and/or c) Frequency list with exception.

A third solution extends the second solution by using frequency-based optimizations.

According to a fourth solution, on-demand system information request is used to request Slice Information for one or more slice groups. The network then signals the Slice Information for the requested slice groups including any exceptional list of Cell-identities that do not support the said corresponding slice group. In one example, this is done by simply extending SI-RequestConfig, inside SIB1. The fourth solution is also applicable for dedicated SI requests.

FIG. 1 depicts a wireless communication system 100 for indicating network slice support for serving and neighbor cells, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G cellular system specified in the 3GPP specifications. For example, the RAN 120 may be a Next Generation Radio Access Network ("NG-RAN"), implementing NR Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication networks, for example, the Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Furthermore, the UL communication signals may comprise one or more uplink channels, such as the Physical Uplink Control Channel ("PUCCH") and/or Physical Uplink Shared Channel ("PUSCH"), while the DL communication signals may comprise one or more DL channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In various embodiments, the remote units 105 may communicate directly with each other (e.g., device-to-device communication) using sidelink communication (not shown in FIG. 1). Here, sidelink transmissions may occur on sidelink resources. A remote unit 105 may be provided with different sidelink communication resources according to different allocation modes. As used herein, a "resource pool" refers to a set of resources assigned for sidelink operation. A resource pool consists of a set of resource blocks (i.e., Physical Resource Blocks ("PRB")) over one or more time units (e.g., Orthogonal Frequency Division Multiplexing ("OFDM") symbols, subframes, slots, subslots, etc.). In some embodiments, the set of resource blocks comprises contiguous PRBs in the frequency domain. A PRB, as used herein, consists of twelve consecutive subcarriers in the frequency domain.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or Packet Data Network ("PDN") connection) with the mobile core network 140 via the RAN 120. The PDU session represents a logical connection between the remote unit 105 and the User Plane Function ("UPF") 141. The mobile core network 140 then relays traffic between the remote unit 105 and the application server 151 in the packet data network 150 using the PDU session (or other data connection).

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides E2E user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QOS Identifier ("5Q1").

In the context of a 4G/LTE system, such as the Evolved Packet System ("EPS"), a PDN connection (also referred to as EPS session) provides E2E UP connectivity between the remote unit and a PDN. The PDN connectivity procedure establishes an EPS Bearer, i.e., a tunnel between the remote unit 105 and a PDN Gateway ("PGW", not shown in FIG. 1) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121.

To facilitate indicating network slice support for serving and neighbor cells, the base unit 121 transmits a slice information 125 to a remote unit 105, where the remote unit 105 uses the slice information to perform cell selection (or cell reselection). In various embodiments, the base unit 121 encodes the slice information 125 using an indexing scheme, as described in more detail below. Consequently, the remote unit 105 uses the indexing scheme to derive the complete slice information from the encoded information transmitted by the base unit 121.

Note that during NR operation on unlicensed spectrum (referred to as "NR-U"), the base unit 121 and the remote unit 105 communicate over unlicensed (i.e., shared) radio spectrum. Similarly, during LTE operation on unlicensed spectrum (referred to as "LTE-U"), the base unit 121 and the remote unit 105 also communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of NAS signaling, NAS ciphering and integrity protection, registration management, connection management, mobility management, access authentication and authorization, security context management. The SMF 145 is responsible for session management (i.e., session establishment, modification, release), remote unit (i.e., UE) Internet Protocol ("IP") address allocation and management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a S-NSSAI while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

The Operations, Administration and Maintenance ("OAM") 160 is involved with the operating, administering, managing, and maintaining of the system 100. "Operations" encompass automatic monitoring of environment, detecting and determining faults and alerting admins. "Administration" involves collecting performance stats, accounting data for the purpose of billing, capacity planning using Usage data and maintaining system reliability. Administration can also involve maintaining the service databases which are used to determine periodic billing. "Maintenance" involves upgrades, fixes, new feature enablement, backup and restore and monitoring the media health. In certain embodiments, the OAM 160 may also be involved with provisioning, i.e., the setting up of the user accounts, devices, and services.

While FIG. 1 depicts components of a 5G RAN and a 5G core network, the described embodiments for indicating network slice support for serving and neighbor cells apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station/base unit, but it is replaceable by any other radio access node, e.g., gNB, ng-eNB, eNB, Base Station ("BS"), base station unit, Access Point ("AP"), NR BS, 5G NB, Transmission and Reception Point ("TRP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems indicating network slice support for serving and neighbor cells.

Figure 2:
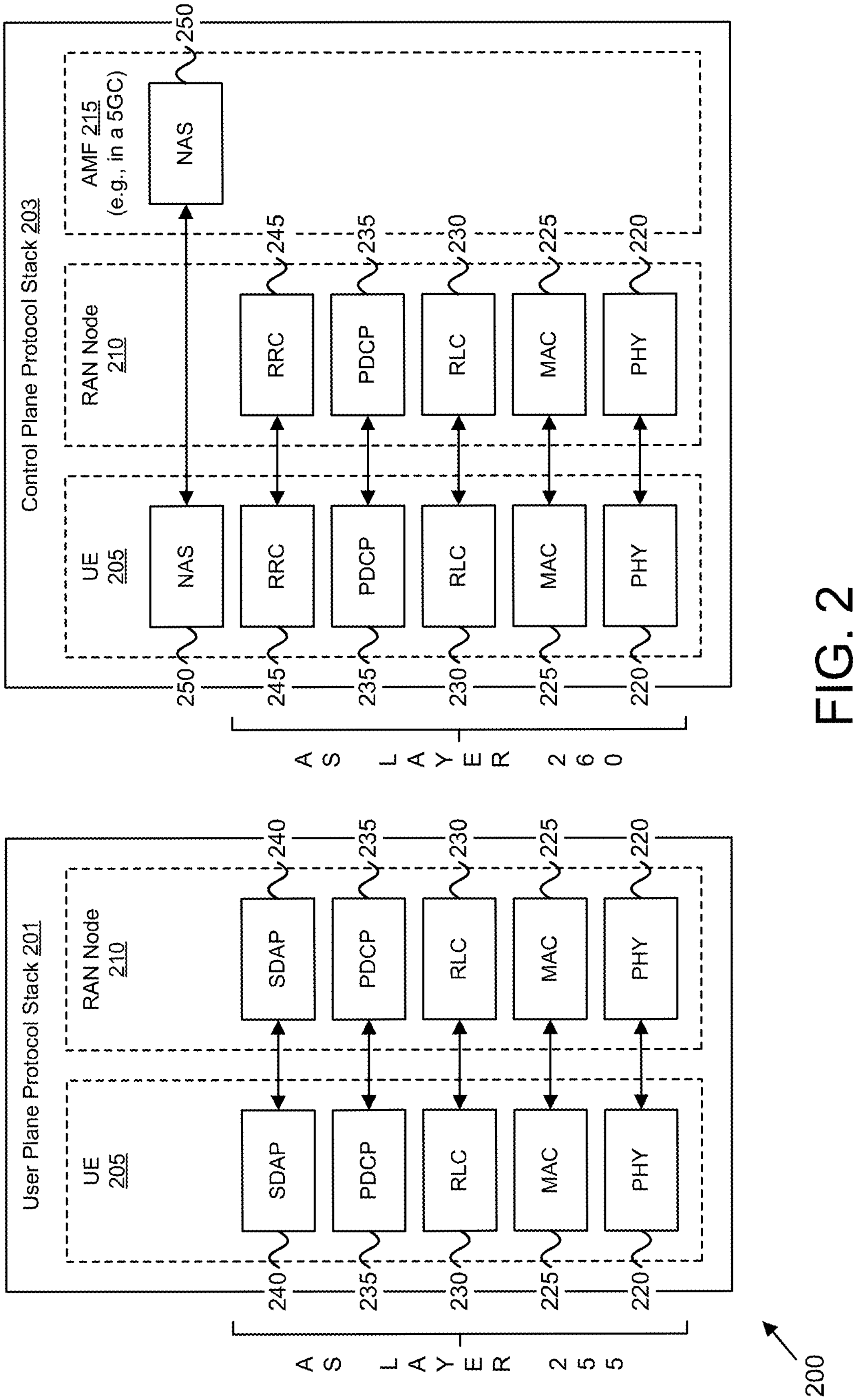
FIG. 2 is a block diagram illustrating one embodiment of a New Radio ("NR") protocol stack.

FIG. 2 depicts an NR protocol stack 200, according to embodiments of the disclosure. While FIG. 2 shows the UE 205, the RAN node 210 and an AMF 215 in a 5G core network ("5GC"), these are representatives of a set of remote units 105 interacting with a base unit 121 and a mobile core network 140. As depicted, the NR protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") sublayer 240. The Control Plane protocol stack 203 includes a PHY layer 220, a MAC sublayer 225, an RLC sublayer 230, and a PDCP sublayer 235. The Control Plane protocol stack 203 also includes a Radio Resource Control ("RRC") layer 245 and a NAS layer 250.

The AS layer 255 (also referred to as "AS protocol stack") for the User Plane protocol stack 201 consists of at least SDAP, PDCP, RLC and MAC sublayers, and the physical layer. The AS layer 260 for the Control Plane protocol stack 203 consists of at least RRC, PDCP. RLC and MAC sublayers, and the physical layer. The Layer-2 ("L2") is split into the SDAP, PDCP. RLC and MAC sublayers. The Layer-3 ("L3") includes the RRC layer 245 and the NAS layer 250 for the control plane and includes, e.g., an IP layer and/or PDU Layer (not depicted) for the user plane. L1 and L2 are referred to as "lower layers," while L3 and above (e.g., transport layer, application layer) are referred to as "higher layers" or "upper layers."

The PHY layer 220 offers transport channels to the MAC sublayer 225. The PHY layer 220 may perform a beam failure detection procedure using energy detection thresholds, as described herein. In certain embodiments, the PHY layer 220 may send an indication of beam failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides functions for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and an AMF 215 in the 5GC. NAS messages are passed transparently through the RAN. The NAS layer 250 is used to manage the establishment of communication sessions and for maintaining continuous communications with the UE 205 as it moves between different cells of the RAN. In contrast, the AS layers 255 and 260 are between the UE 205 and the RAN (i.e., RAN node 210) and carry information over the wireless portion of the network. While not depicted in FIG. 2, the IP layer exists above the NAS layer 250, a transport layer exists above the IP layer, and an application layer exists above the transport layer.

The MAC sublayer 225 is the lowest sublayer in the L2 architecture of the NR protocol stack. Its connection to the PHY layer 220 below is through transport channels, and the connection to the RLC sublayer 230 above is through logical channels. The MAC sublayer 225 therefore performs multiplexing and demultiplexing between logical channels and transport channels: the MAC sublayer 225 in the transmitting side constructs MAC PDUs (also known as transport blocks ("TBs")) from MAC Service Data Units ("SDUs") received through logical channels, and the MAC sublayer 225 in the receiving side recovers MAC SDUs from MAC PDUs received through transport channels.

The MAC sublayer 225 provides a data transfer service for the RLC sublayer 230 through logical channels, which are either control logical channels which carry control data (e.g., RRC signaling) or traffic logical channels which carry user plane data. On the other hand, the data from the MAC sublayer 225 is exchanged with the PHY layer 220 through transport channels, which are classified as UL or DL. Data is multiplexed into transport channels depending on how it is transmitted over the air.

The PHY layer 220 is responsible for the actual transmission of data and control information via the air interface, i.e., the PHY layer 220 carries all information from the MAC transport channels over the air interface on the transmission side. Some of the important functions performed by the PHY layer 220 include coding and modulation, link adaptation (e.g., Adaptive Modulation and Coding ("AMC")), power control, cell search and random access (for initial synchronization and handover purposes) and other measurements (inside the 3GPP system (i.e., NR and/or LTE system) and between systems) for the RRC layer 245. The PHY layer 220 performs transmissions based on transmission parameters, such as the modulation scheme, the coding rate (i.e., the modulation and coding scheme ("MCS")), the number of physical resource blocks, etc.

Figure 3:
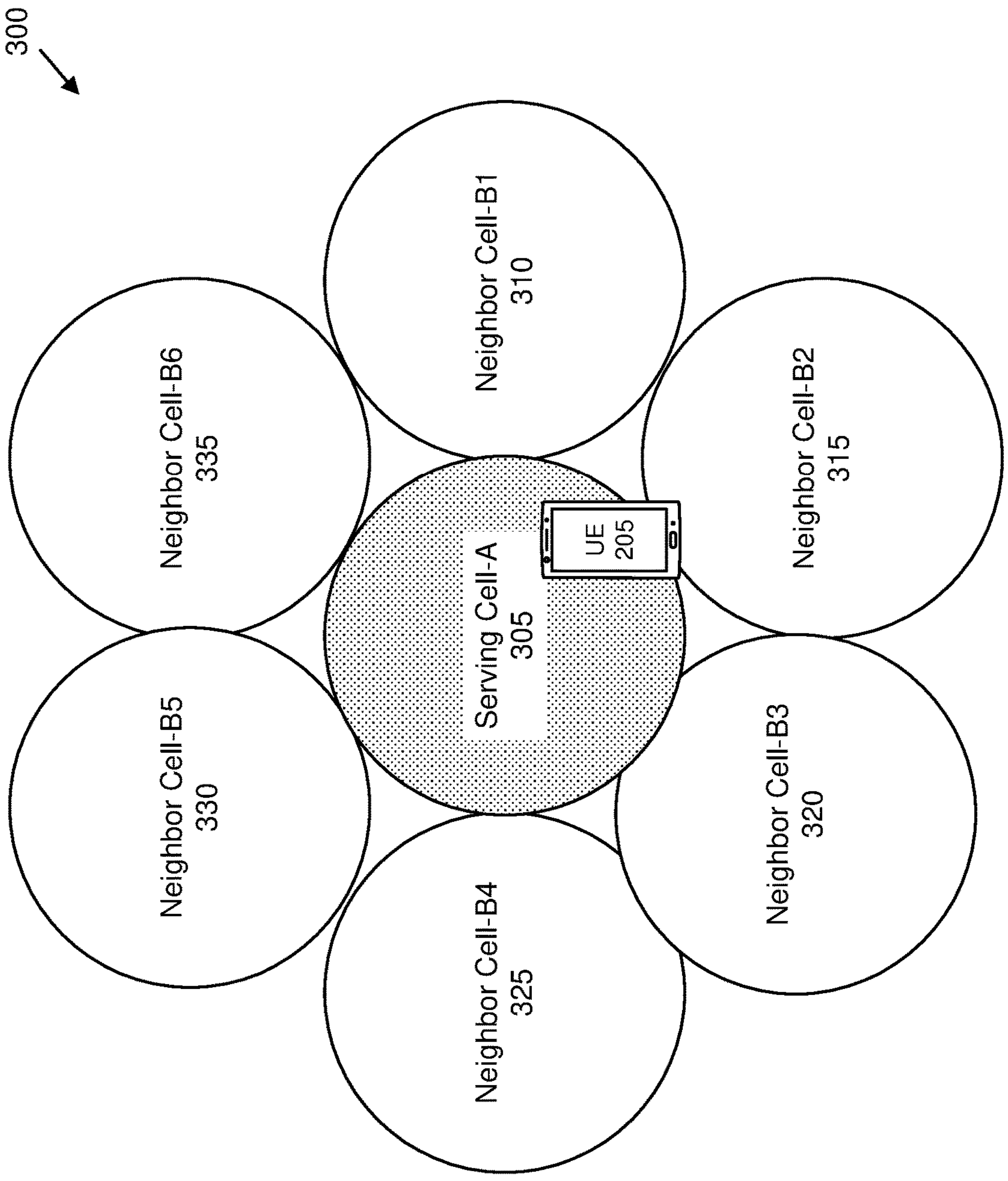
FIG. 3 is a diagram illustrating one embodiment of cell distribution in a Radio Access Network ("RAN")

FIG. 3 depicts a mobile cell arrangement 300, according to embodiments of the disclosure. In the depicted embodiment, a serving cell-A 305 is bordered by a neighbor cell-B1 310, a neighbor cell-B2 315, a neighbor cell-B3 320, a neighbor cell-B4 325, a neighbor cell-B5 330, and a neighbor cell-B6 335. Each of the serving cell-A 305 and the neighbor cells 310-335 operates on a carrier frequency: however, as discussed herein, each cell may support multiple network slices, with each network slice corresponding to a different carrier frequency. Still further, the same network slice may not correspond to the same carrier frequency from one cell to another.

As shown in FIG. 3, a serving cell-A 305 for a UE 205 has 6 (max 32) neighbor cells which could be on 3 (max 8) different frequencies. Therefore, repeating the frequency information element 18 times with 22 bits each will be a waste of radio resources. Note that in 3GPP specifications, a serving cell may have up to 32 neighbor cell which could be on up to 8 different frequencies. The disclosed solutions optimize signaling methods that enable a cell (e.g., serving cell) to signal the slice supported in neighbor cells (e.g., using broadcast or dedicated signaling).

One description of the concept of network slicing as follows: 5G network slicing is a network architecture that enables the multiplexing of virtualized and independent logical networks on the same physical network infrastructure. Each network slice is an isolated end-to-end network tailored to fulfil diverse requirements requested by a particular application.

For this reason, this technology assumes a central role to support 5G mobile networks that are designed to efficiently embrace a plethora of services with very different service level requirements ("SLR"). The realization of this service-oriented view of the network leverages on the concepts of software-defined networking ("SDN") and network function virtualization ("NFV") that allow the implementation of flexible and scalable network slices on top of a common network infrastructure.

Moreover, strong demand in wireless communication is expected in vertical markets, as connectivity and mobility empower the transformation and innovation in industries such as manufacturing, transportation, energy and civil services, healthcare, and many more. These diverse vertical services bring about a wide range of performance requirements in throughput, capacity, latency, mobility, reliability, position accuracy, etc. NR technology promises a common RAN platform to meet the challenges of current and future use cases and services. And the works of network slicing in Rel-15 further advance network architecture towards more flexibility and higher scalability for a multitude of services of disparate requirements.

While Rel-15 specifications can provide the foundation of a common connectivity platform for various services, more efforts should be made in Rel-17 on RAN support of network slicing, to make it a tool that network operators can apply to meet the challenge of opening new source of revenue in addition to the one derived from customer subscription. More particularly, the new works should provide technical tools in RAN for network operators to get application providers involved in customizing RAN's design, deployment, and operation for better support of the applications providers' business.

As noted above that a UE determination of slice supported in a neighbor cell, which could be the highest ranked cell on a given frequency, is unclear. Therefore, the below solutions support slice-based cell reselection, specify mechanisms and signaling including: a) to assist cell reselection, broadcast the supported Slice Information of the current cell and neighbor cells, and cell reselection priority per slice in system information message; and b) to assist cell reselection, include Slice Information (with similar information as in SI message) in RRCRelease message.

For slice specific cell selection (or reselection) it is possible that (suitable) cells on the same frequency belonging to different Tracking Areas ("TAs") support different network slice(s). Accordingly, for cell reselections the UE cannot blindly assume that slice support on a frequency is uniform i.e., all the cells on the frequency support the same set of slices. Therefore, serving cell broadcasting slice support just for neighboring frequencies may not be sufficient and UE needs to determine if the highest ranked cell supports the selected slice (i.e., the slice from Step 2 of the above-described cell (re) selection procedure).

Thus, to improve slice-based cell reselection, described herein are signaling means for signaling Slice Information of the current cell and neighbor cells, and cell reselection priority per slice (of the frequencies supporting the slice) in system information as well as in RRCRelease message.

The present disclosure uses the terms "Slice Information" and "slice support" which are defined as follows:

The term "Slice Information" is defined as frequency priority mapping for each of the slice (slice→frequency(ies) →absolute priority of each of the frequency) and therefore may consist of these 3 elements (slice, frequency, and an absolute frequency priority). In other embodiment, Slice Information consists of a subset of these 3 elements (slice, frequency, and an absolute frequency priority). The Slice Information (for a slice or slice group) can be provided to the UE in the RAN using broadcast and/or dedicated signaling. Slice Information may be provided for the serving as well as neighboring frequencies.

The term "slice support" is used in this document to signify only the slice(s)/slice group(s) supported in a particular cell (serving cell or for neighbor cell). Therefore, the slice support is not defined for a frequency but rather is defined for a cell.

Most or even all the disclosure henceforth applies equally to slice and slice group even though at places only "slice" or "slice group" might appear. So, in that sense methods disclosed are applicable both for e.g., Slice A and Slice group A, but, generally, Slice group A may contain more than one slices including or not including Slice A.

Though only RRC based signaling (e.g., broadcasting or RRCRelease) is mentioned in the embodiments below, however, NAS based signaling (e.g., signaling used in NAS registration procedure) can also use the disclosed optimizations.

According to embodiments of the first solution, an indexing scheme (i.e., indexing method) is used such that repetition of different information elements like frequency, slice, and/or Cell-identity (PCI, CellIdentity) need not consume as many bits as the original information. Here, "PCI" refers to the Physical Cell Identity (e.g., PhysCellId as defined in 3GPP TS 38.331) and CellIdentity refers to the 36-bit global cell identity as defined in 3GPP TS 38.331.

Figures 4, 5:
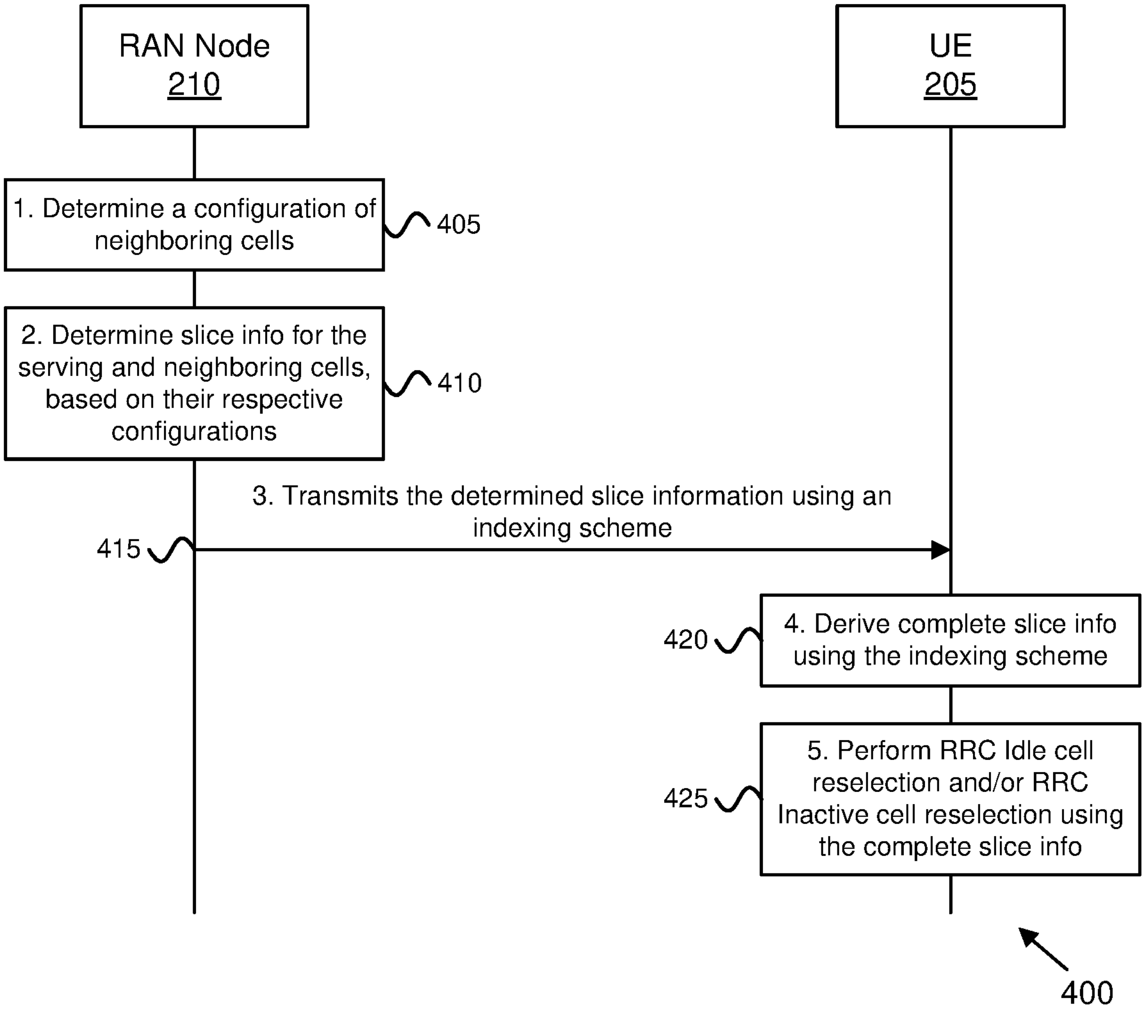
FIG. 4 is a diagram illustrating one embodiment of a procedure for indicating network slice support for serving and neighbor cells.
FIG. 5 is a diagram illustrating one embodiment of a single-network slice selection assistance information ("S-NSSAI")

FIG. 4 depicts a procedure 400 for using an indexing scheme, according to embodiments of the first solution. The procedure 400 involves a network entity, such as the depicted RAN node 210, and at least one UE, represented by the UE 205. The call flow of the procedure is as follows:

At Step 1, the RAN node 210 (i.e., associated with a serving cell) determines a configuration of neighboring cells (see block 405). It is assumed that the RAN node 210 is already aware of the configuration of the serving cell (i.e., which network slices are supported and at which carrier frequencies).

In the example of FIG. 3, the RAN node 210 associated with the serving cell-A 305, assumed to operate on at least carrier frequency F1 and support at least Slice A. Assuming a frequency reuse factor of 4, the neighbor cell-B1 310 and the neighbor cell-B4 325 may operate on carrier frequency F2, the neighbor cell-B2 315 and the neighbor cell-B5 330 may operate on carrier frequency F3, and the neighbor cell-B3 320 and the neighbor cell-B6 335 may operate on carrier frequency F4.

Returning to FIG. 4, is some embodiments, the RAN node 210 determines the configuration of neighboring cells and corresponding Slice Information based on at least one of: an OAM configuration, self-optimizing network reports from one or more UEs, an Xn interface between the serving cell (e.g., serving cell-A 305) and the neighboring cells, or a combination thereof.

At Step 2, the RAN node 210 determines Slice Information for both the serving cell and the neighboring cells, based on their respective configurations (see block 410). Here, the Slice Information includes at least an identifier of a set of supported slices (or supported slice groups) and a set of carrier frequencies corresponding to the respective supported slices (or supported slice groups). In some embodiments, the Slice Information further comprises an absolute priority value for each frequency in the set of carrier frequencies.

At Step 3, the RAN node 210 transmits (e.g., broadcasts) the determined Slice Information in the serving cell using an indexing scheme, while each UE 205 is configured to receive the (encoded) Slice Information from the RAN node 210 (see messaging 415).

At Step 4, the UE 205 uses the indexing scheme to derive the complete (i.e., decoded) Slice Information (see block 420). Various indexing schemes are described in the below solutions.

At Step 5, the UE performs cell reselection (i.e., RRC Idle cell reselection and/or RRC Inactive cell reselection) using the complete Slice Information (see block 425).

The use of the indexing scheme allows the RAN node 210 to compress the Slice Information, i.e., encode the Slice Information using fewer bits than the original representation. In some embodiments, the indexing scheme is used to signal at least the set of carrier frequencies.

In other embodiments, the indexing scheme may also be used to indicate slice (or slice group) identifiers and/or frequency priority values.

According to a first example, an NR frequency is defined using ARFCN-ValueNR (i.e., from 3GPP TS 38.331) which is of type INTEGER with value in the range (0 . . . maxNARFCN). The maxNARFCN is 3279165 and therefore a "frequency" signaling requires 22 bits. Here, "ARFCN" refers to the Absolute Radio Frequency Carrier Number. A serving cell can have neighbor cells on maximum 8 inter-frequencies. So, instead of signaling 22×8 bits, the network may use an indexing method like in Table 1:

TABLE 1

| Index (3 bits) | Frequency |
|---|---|
| 0 ('000') | F1 |
| 1 ('001') | F2 |
| 2 ('010') | F3 |
| 3 ('011') | F4 |
| 4 ('100') | F5 |
| 5 ('101') | F6 |
| 6 ('110') | F7 |
| 7 ('111') | F8 |

In one implementation, the above Table is included in SIB4. However, the above Table 1 does not need to be a new list in SIB4 or in a new SIB, if a new SIB is used for signaling Slice Information. Rather, the above Table 1 may be realized as the current list of inter-frequency neighbors from SIB4 (InterFreqCarrierFreqList) irrespective of if SIB4 or a new SIB or RRCRelease message is used for signaling Slice Information. In the case that the current list of inter-frequency neighbors comprises Table 1, the UE takes notice of the sequence of appearance of frequencies in the SIB4 list (InterFreqCarrierFreqList) and implicitly starts indexing the first appearing frequency in the list from 0 (or 1 if an enhancement mentioned further using the code point '000' is used) and continues indexing to the next appearing frequency and so on.

In a first embodiment of the first solution, frequencies are listed (e.g., in a broadcast or dedicated signaling) exactly as in Table 1. And any reference to a particular frequency (say F3) is made using the corresponding index value (i.e., index=2, in this case). If the frequency F3 in the said example will appear twice then this provides a saving of 19 bits (22 bits-3 bits for signaling 8 index values).

In a second embodiment of the first solution, the Table 1 is not used explicitly; rather, the indexing is done implicitly. Table 2 depicts example Slice Information for a cell where the indexing is done implicitly.

TABLE 2

| Slice | Frequency | Frequency Priority |
|---|---|---|
| A | F1 (ARFCN-ValueNR) | Pi |
| | F2 (ARFCN-ValueNR) | Pq |
| B | F1 (index) | Pr |
| | F3 (ARFCN-ValueNR) | Ps |

The first occurrence of any frequency will be signaled using entire 22 bits each in Table 2. But any repetition of a frequency that has already appeared, will be done using an index which has a value corresponding to the order if its appearance in the Table 2. So, in this table first occurrences of carrier frequencies F1, F2 and F3 will be signaled using entire 22 bits but second occurrence of F1 (corresponding to first entry of F1 for Slice B) will use an index—and the value of the 3-bit index will be '000' since the F1 appears first in the table.

Taking another example to explain further, in Table 3, second occurrence of F2 (corresponding to first entry of F2 for Slice B) will use an index—and the value of the 3-bit index will be '001' since the F2 appears second (after F1) in the table:

TABLE 3

| Slice | Frequency | Frequency Priority |
|---|---|---|
| A | F1 (ARFCN-ValueNR) | Pi |
| | F2 (ARFCN-ValueNR) | Pq |

TABLE 3-continued

| Slice | Frequency | Frequency Priority |
|---|---|---|
| B | F2 (index) | Pr |
| | F3 (ARFCN-ValueNR) | Ps |

In one further enhancement, the first index (i.e., '000') is reserved for the serving frequency. If so, the first row of Table 1 does not need to be signaled. Table 4 depicts an example of the modified table:

TABLE 4

| Index (3 bits) | Frequency |
|---|---|
| 1 ('001') | F2 |
| 2 ('010') | F3 |
| 3 ('011') | F4 |
| 4 ('100') | F5 |
| 5 ('101') | F6 |
| 6 ('110') | F7 |
| 7 ('111') | F8 |

Therefore, wherever corresponding to any slice of Slice Information the index appears as '000', this points to the serving frequency (of the cell where the UE is camped, system information is read or where the UE is RRC Connected). The code point '000' is just an example, and it could be one of the other code points.

FIG. 5 depicts content of a S-NSSAI, according to embodiments of the disclosure. A slice is identified by S-NSSAI which is defined in as containing a Slice/Service Type ("SST") and, optionally, a Slice Differentiator ("SD"). The SST is an 8-bit field that refers to expected behavior of the network slice, e.g., in terms of features and/or services. The purpose of the SD is to differentiate between multiple network slice instances having the same SST. For example, different "tenants" can be differentiated using the SD. The SD is a 24-bit field. So, a slice signaling can consume up to 32 bits.

According to a second example, the network may support a Slice Group concept, where a slice group consists of one or multiple slices, one slice belongs to one and only one slice group and each slice group is uniquely identified by a slice group identifier. This can avoid publishing slice identities (S-NSSAI) in System Information (security concern and SI size concern). ISE, the signaling of such slice grouping and slice group identity is indicated in NAS signaling to the UE. This applies equally to "slice" as well as to "slice group", even if at many places only "slice" appears. Following examples use slice group (rather than individual slices) assuming number of slice groups are very less compared with the number of slices. For a start, a total of 32 slice groups are assumed below:

TABLE 5

| Index (5 bits) | Slice Group |
|---|---|
| 0 ('00000') | A |
| 1 ('00001') | B |
| 2 ('00010') | C |
| 3 ('00011') | D |
| . . . | . . . |
| . . . | . . . |
| 30 ('11110') | XX |
| 31 ('11111') | XY |

In a first embodiment of the Slice Information exemplified in Table 5, slice groups are listed (e.g., in a broadcast or dedicated signaling) exactly as in Table 5. And any reference to a particular slice group (say 'C') is made using the corresponding index value (i.e., index=2, in this case).

In a second embodiment of the Slice Information exemplified in Table 5, the Table 5 is not used explicitly; rather, the indexing is done implicitly.

TABLE 6

| Frequency | Slice Group | Frequency Priority |
|---|---|---|
| F1 | A | Pi |
| | B | Pq |
| F2 | A | Pr |
| | C | Ps |

If the Slice Information for a cell looks like Table 6, above, then the reappearance of slice group A is signaled using index value rather than the S-NSSAI.

In one further enhancement, the first index (i.e., '00000') is reserved for indicating the slice support same as serving cell. So, if F2 also supports the same slice groups (as on serving cell), then F2 indicates slice group as '00000'. The code point '00000' is just an example, and it could be one of the other code points.

TABLE 7

| Frequency | Slice Group | Frequency Priority |
|---|---|---|
| F1 | A | Pi |
| | B | Pq |
| F2 | 00000 | Pr |
| | | Ps |

If serving cell supports slice groups M and N (not shown in Table 7) and the corresponding frequency priority for serving frequency on these two slice groups i.e., Pr and Ps remain same then even the Pr and Ps may not be signaled, otherwise, these need to be signaled.

According to a third example (Example 3), the signaling for Cell-identity may be optimized in the same way as for an NR frequency in Example 1, i.e., both explicit indices based, and implicit indexing-based implementations are applicable to optimized signaling for Cell-identity.

According to embodiments of the second solution, first slice support for a serving cell is indicated: serving cells lists (e.g., in System Information Block #2 ("SIB2")) the slice support along with corresponding frequency priorities:

Slice A-priority p

Slice B-priority q

Further Slice Information for neighbor cells on each of the neighboring frequencies (Fi) is indicated (e.g., in SIB4 or in RRCRelease message) as follows:

First, an indication ("same-as-indication") is used for each neighboring or serving frequency—and this indicates if slice support or even Slice Information is same as the serving cell or same as one of the other neighboring frequencies. This can use a 3 bits indication as in Table 4, where index '000' indicates the slice support of serving cell.

If the same-as-indication can't be used then for a frequency, one or both of the following indication(s) can be used: a) Slice list without exception (This list lists slices with their corresponding priorities e.g., Slice A_Pi, B_Pq); and/or b) Slice list with exception (This list lists slices with their corresponding priorities e.g., Slice C_Pr and lists Cell-identities on the frequency Fi that do not support the said Slice C).

In a first implementation it is possible to use all three information (i.e., "same-as-indication," "Slice list without exception," and "Slice list with exception") such that same-as-indication frequency is used just as baseline and the other two slice lists can add or replace some information on top of the baseline.

In signaling the values for NR frequency, slice/slice-group and Cell-identities, the optimizations from the first solution can be used. In one example of the first implementation, the parameter ARFCN-Index uses explicit indexing, as shown in FIG. 6A.

FIG. 6A depicts one example of an Abstract Syntax Notation #1 ("ASN.1") structure for a SliceInfo Information Element ("IE"), according to the above descriptions. The example of FIG. 6A corresponds to the first implementation of the first solution, above. The parameter ARFCN-Index corresponds to the index of the order of appearance of a frequency in the Frequency-List. The 'maxSliceGroup' can be defined as 32 or any other integer value. Note that the depicted SliceInfo IE may be included in System Information Block #4 ("SIB4").

The same can be accomplished using the second implementation of the first solution, where the parameter ARFCN-Index uses implicit indexing, as shown in FIG. 6B.

FIG. 6B depicts an exemplary ASN.1 structure for a SliceInfo Information Element ("IE"), as extended according to the above descriptions. The example of FIG. 6B corresponds to the second implementation of the first solution, above. Note that the depicted SliceInfo IE may be included in SIB4.

In the examples of FIG. 6A and FIG. 6B, the element 'Frequency-List' is a list of frequencies that support at least one slice (or slice group). The list 'Frequency-List' may also be referred to as a list of inter-frequency neighbors or a (prioritized) frequency list for slicing. As such the element 'Frequency-List' may be implemented using different names. Additionally, in the examples of FIG. 6A and FIG. 6B, the element 'SliceInfoNeighCells' includes frequency list information, and this may be used to indicate carrier frequency information, e.g., as describe above in the first solution. In the examples of FIG. 6A and FIG. 6B, the parameter 'sliceGroupId' comprises the identity for a slice group.

According to embodiments of a third solution, first slice support for a serving cell is indicated: serving cells lists (e.g., in SIB2) the slice support along with corresponding frequency priorities:

Slice A—priority p

Slice B—priority q

Further Slice Information for neighbor cells on each of the slices (slice-group), Slice_i supported on any of the neighboring cell/frequencies is indicated (e.g., in SIB4 or in RRCRelease message) as follows:

First, an indication ("same-as-indication") is used for each slice (slice-group)—and this indicates if supported frequencies and optionally the corresponding frequency priority is same as one of the other slice (slice-group). This can use a 5 bits indication as in Table 5 if there would be 32 slice-groups defined.

If the same-as-indication cannot be used then for a slice-group, one or both of the following indication(s) can be used:

Frequency list without exception: This list lists all frequencies that support selected Slice_i (as in step 2 of the slice-based cell reselection behavior) with their corresponding priorities e.g., F1_Pi, F2_Pq and so on.

Frequency list with exception: This list lists all frequencies that support selected Slice_i (as in step 2 of the slice-based cell reselection behavior) with their corresponding priorities e.g., F3_Pr and lists Cell-identities on the frequency F3 that do not support the selected Slice A.

TABLE 8

| | | |
|---|---|---|
| Slice Group A | Frequency without exception list | F1-Priority Pi<br>F2-Priority-Pq |
| | Frequency with exception list | F3-Priority-Pr<br>Exceptions:<br>PCI-x<br>PCI-z |
| Slice Group B | Frequency without exception list | F1-Priority-Pi |
| | Frequency with exception list | F3-Priority-Pr<br>Exceptions:<br>PCI-x<br>PCI-z |

In one implementation it is possible to use all three information (i.e., "same-as-indication," "Frequency list without exception," and "Frequency list with exception") such that same-as-indication frequency is used just as baseline and the other two slice lists can add or replace some information on top of the baseline.

In signaling the values for NR frequency, slice/slice-group and Cell-identities, the optimizations from the first solution can be used.

FIG. 7 depicts an exemplary ASN. 1 structure for the IE SliceInfo, according to embodiments of the third solution. In various embodiments, the SliceInfo IE is included in SIB4. In the depicted ASN. 1 structure, if same-As-Indication is present, the slice being defined has exactly the same information content as the slice indicated as same. Further, in one case the NR-Frequency-index and cellId-index can be used for any repetition of the NR Frequency or cellId in the Slice Information.

In the examples of FIG. 7, the elements 'Freq-List-WO-Exception' and 'Freq-List-with-Exception' are lists of frequencies that support at least one slice (or slice group). Note that the elements 'Freq-List-WO-Exception' and 'Freq-List-with-Exception' may be implemented using different names. Additionally, in the examples of FIG. 7, the element 'SliceInfoNeighCells' includes frequency list information, and this may be used to indicate carrier frequency information, e.g., as describe above in the first solution. In the examples of FIG. 7, the parameter 'SliceGroupId' comprises the identity for a slice group. The parameters 'cellReselectionPriority' and 'cellReselectionSubPriority' refer to the frequency priorities described above.

The UE may collect information for all slices and can build information on PCIs (or CellIdentity) appearing in the list such that it knows which slices are supported on a given PCI that has appeared at least in one of the exception list. When such a PCI is found to be the highest ranked cell, UE can utilize this knowledge to determine that another higher priority slice is supported on this cell and can reselect to this slice, if there were no remaining frequencies for the current selected slice.

For example, for a UE performing slice-based cell reselection, if a cell fulfils the criteria for cell reselection based on reselection priority for the frequency and slice group, but this cell does not support the slice group, then the UE may re-derive a reselection priority for the frequency by considering the slice group(s) supported by this cell. Here, the reselection priority may be used until the highest ranked cell changes on the frequency, or new slice or slice group priorities are received from NAS.

According to embodiments of a fourth solution, on demand system information request is used to request Slice Information for one or more slice groups. The network then signals the Slice Information for the requested slice groups including any exceptional list of Cell-identities that do not support the said corresponding slice group. In one example, this is done by simply extending SI-RequestConfig, inside SIB1 as shown in FIG. 8.

FIG. 8 depicts an exemplary ASN. 1 structure for a System Information ("SI") Request Configuration IE, as extended according to the above descriptions.

In another implementation, a RRC Connected UE can request Slice Information for one or more or all slices supported in the neighborhood by requesting using DedicatedSIBRequest message.

Figure 9:
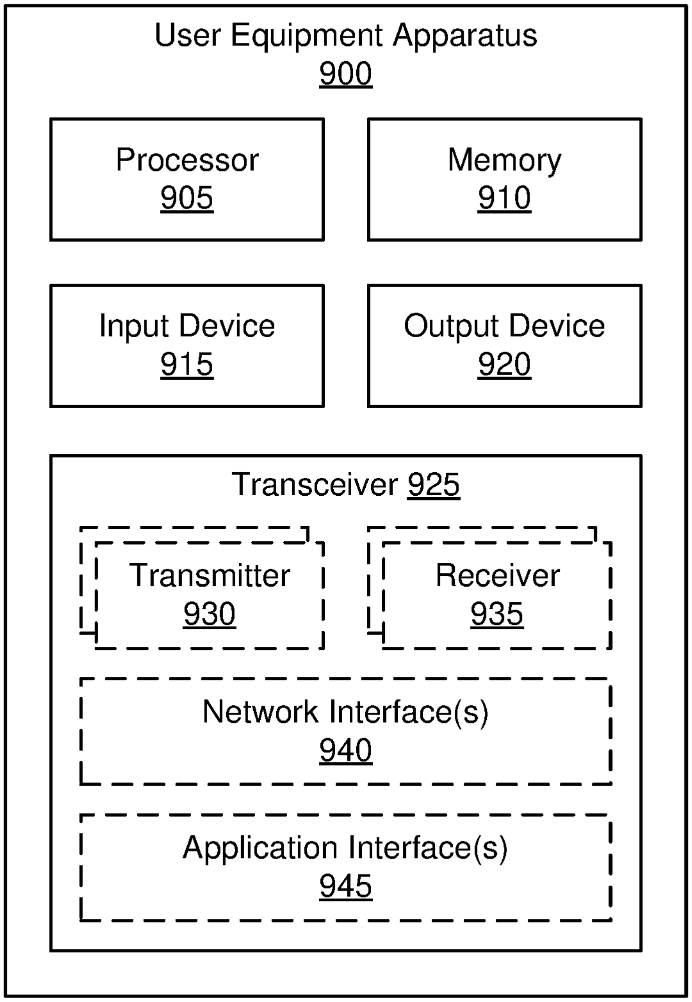
FIG. 9 is a block diagram illustrating one embodiment of a user equipment apparatus that may be used for indicating network slice support for serving and neighbor cells.

FIG. 9 depicts a user equipment apparatus 900 that may be used for indicating network slice support for serving and neighbor cells, according to embodiments of the disclosure. In various embodiments, the user equipment apparatus 900 is used to implement one or more of the solutions described above. The user equipment apparatus 900 may be one embodiment of a user endpoint, such as the remote unit 105 and/or the UE 205, as described above. Furthermore, the user equipment apparatus 900 may include a processor 905, a memory 910, an input device 915, an output device 920, and a transceiver 925.

In some embodiments, the input device 915 and the output device 920 are combined into a single device, such as a touchscreen. In certain embodiments, the user equipment apparatus 900 may not include any input device 915 and/or output device 920. In various embodiments, the user equipment apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. In some embodiments, the transceiver 925 communicates with one or more cells (or wireless coverage areas) supported by one or more base units 121. In various embodiments, the transceiver 925 is operable on unlicensed spectrum. Moreover, the transceiver 925 may include multiple UE panels supporting one or more beams. Additionally, the transceiver 925 may support at least one network interface 940 and/or application interface 945. The application interface(s) 945 may support one or more APIs. The network interface(s) 940 may support 3GPP reference points, such as Uu, N1, PC5, etc. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In various embodiments, the processor 905 controls the user equipment apparatus 900 to implement the above-described UE behaviors. In certain embodiments, the processor 905 may include an application processor (also known as "main processor") which manages application-domain and operating system ("OS") functions and a baseband processor (also known as "baseband radio processor") which manages radio functions.

In various embodiments, via the transceiver 925, the processor 905 receives preliminary (i.e., first) slice information from a mobile communication network. In various embodiments, the preliminary slice information includes an identifier of a respective slice group and a set of carrier frequencies corresponding to the respective slice group, where the preliminary slice information is encoded using an indexing scheme. In certain embodiments, the preliminary slice information further includes an absolute priority value for each frequency in the set of carrier frequencies. In some embodiments, the indexing scheme is used to encode at least the set of carrier frequencies. In further embodiments, the indexing scheme may be used to encode slice group identifiers and/or an absolute priority value for each frequency in the set of carrier frequencies.

In some embodiments, to receive the preliminary slice information indicated using the indexing scheme, the processor 905 may control the transceiver 925 to receive a system information block or dedicated RRC signaling including the preliminary slice information. In some embodiments, to receive the preliminary slice information indicated using the indexing scheme, the processor 905 uses a predetermined table to determine at least one of: A) a same/common frequency, B) a slice identifier (i.e., S-NSSAI), C) a slice group identifier, D) a cell identity, or E) a combination thereof.

In certain embodiments, to receive the preliminary slice information indicated using the indexing scheme, the processor 905 points to a first information element when a second information of the same type has the same values for all the subfields and sub-parameters. Additionally, the processor 905 replaces a value for the second information with an actual value of the first information element.

In some embodiments, to determine the complete slice information from the received preliminary slice information, the processor 905 indexes the first occurrence of first new value for a particular information element type, indexing starting from integer value '0' or '1'. Additionally, the processor 905 stores (e.g., in the memory 910) store the index mapping to the actual value of a complete slice information element.

The processor 905 determines complete (i.e., second) slice information from the received preliminary slice information. In some embodiments, the processor 905 may control the transceiver 925 to receive a list of carrier frequencies, where the indexing scheme includes: an index value of '0' to indicate a carrier frequency of the serving cell, an index value of 'l' to indicate a first carrier frequency in the list of carrier frequencies, and an index value of '2' to indicate a second carrier frequency in the list of carrier frequencies. In certain embodiments, to receive the list of carrier frequencies, the processor 905 may control the transceiver 925 to receive a system information block or dedicated Radio Resource Control signaling.

In some embodiments, to receive the preliminary slice information indicated using the indexing scheme, the processor 905 references an index of a predetermined table (e.g., preconfigured or defined in specification) to signal a carrier frequency, where an amount of bits needed to encode the index is less than a number of bits needed to encode the carrier frequency. In certain embodiments, a number of index values in the indexing scheme is greater than a number of entries in the predetermined table, where a particular index value indicates a carrier frequency of the serving cell, and where the carrier frequency of the serving cell is not an entry in the predetermined table.

In some embodiments, to determine the complete slice information from the received preliminary slice information, the processor is configured to cause the apparatus to replace a pointer value for a particular information element with an actual value of the information values pointed to. In some embodiments, to determine the complete slice information from the received preliminary slice information, the processor is configured to cause the apparatus to: A) increment an index for first occurrence of next new value for a particular information element type, and B) store the index mapping to the actual value of the information element.

The processor 905 performs cell reselection (i.e., RRC Idle cell reselection and/or RRC Inactive cell reselection) using the complete slice information.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to indicating network slice support for serving and neighbor cells. For example, the memory 910 may store parameters, configurations, and the like as described above. In certain embodiments, the memory 910 also stores program code and related data, such as an operating system or other controller algorithms operating on the user equipment apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 920 may include a wearable display separate from, but communicatively coupled to, the rest of the user equipment apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, the output device 920 may be located near the input device 915.

The transceiver 925 communicates with one or more network functions of a mobile communication network via one or more access networks. The transceiver 925 operates under the control of the processor 905 to transmit messages, data, and other signals and also to receive messages, data, and other signals. For example, the processor 905 may selectively activate the transceiver 925 (or portions thereof) at particular times in order to send and receive messages.

The transceiver 925 includes at least one transmitter 930 and at least one receiver 935. One or more transmitters 930 may be used to provide UL communication signals to a base unit 121, such as the UL transmissions described herein. Similarly, one or more receivers 935 may be used to receive DL communication signals from the base unit 121, as described herein. Although only one transmitter 930 and one receiver 935 are illustrated, the user equipment apparatus 900 may have any suitable number of transmitters 930 and receivers 935. Further, the transmitter(s) 930 and the receiver(s) 935 may be any suitable type of transmitters and receivers. In one embodiment, the transceiver 925 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example, a single chip performing functions for use with both licensed and unlicensed radio spectrum. In some embodiments, the first transmitter/receiver pair and the second transmitter/receiver pair may share one or more hardware components. For example, certain transceivers 925, transmitters 930, and receivers 935 may be implemented as physically separate components that access a shared hardware resource and/or software resource, such as for example, the network interface 940.

In various embodiments, one or more transmitters 930 and/or one or more receivers 935 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 930 and/or one or more receivers 935 may be implemented and/or integrated into a multi-chip module. In some embodiments, other components such as the network interface 940 or other hardware components/circuits may be integrated with any number of transmitters 930 and/or receivers 935 into a single chip. In such embodiment, the transmitters 930 and receivers 935 may be logically configured as a transceiver 925 that uses one or more common control signals or as modular transmitters 930 and receivers 935 implemented in the same hardware chip or in a multi-chip module.

Figure 10:
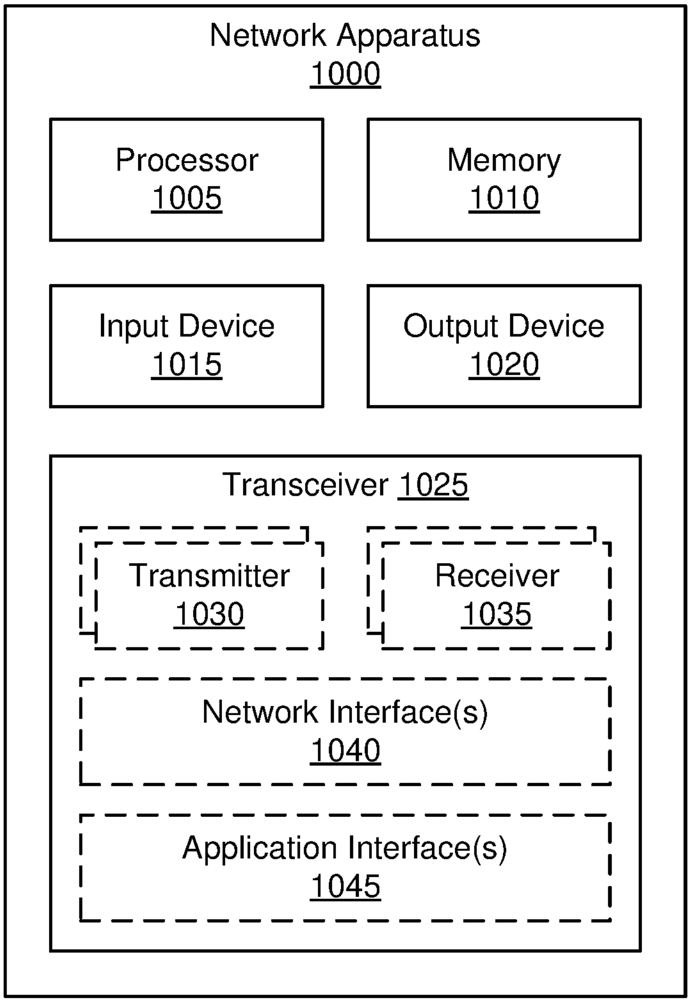
FIG. 10 is a block diagram illustrating one embodiment of a network apparatus that may be used for indicating network slice support for serving and neighbor cells.

FIG. 10 depicts a network apparatus 1000 that may be used for indicating network slice support for serving and neighbor cells, according to embodiments of the disclosure. In one embodiment, the network apparatus 1000 may be one implementation of a network endpoint, such as the base unit 121 and/or RAN node 210, as described above. Furthermore, the network apparatus 1000 may include a processor 1005, a memory 1010, an input device 1015, an output device 1020, and a transceiver 1025.

In some embodiments, the input device 1015 and the output device 1020 are combined into a single device, such as a touchscreen. In certain embodiments, the network apparatus 1000 may not include any input device 1015 and/or output device 1020. In various embodiments, the network apparatus 1000 may include one or more of: the processor 1005, the memory 1010, and the transceiver 1025, and may not include the input device 1015 and/or the output device 1020.

As depicted, the transceiver 1025 includes at least one transmitter 1030 and at least one receiver 1035. Here, the transceiver 1025 communicates with one or more remote units 105. Additionally, the transceiver 1025 may support at least one network interface 1040 and/or application interface 1045. The application interface(s) 1045 may support one or more APIs. The network interface(s) 1040 may support 3GPP reference points, such as Uu, N1, N2 and N3. Other network interfaces 1040 may be supported, as understood by one of ordinary skill in the art.

The processor 1005, in one embodiment, may include any known controller capable of executing computer-readable instructions and/or capable of performing logical operations. For example, the processor 1005 may be a microcontroller, a microprocessor, a CPU, a GPU, an auxiliary processing unit, a FPGA, or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025.

In various embodiments, the network apparatus 1000 is a RAN node (e.g., gNB) that communicates with one or more UEs, as described herein. In such embodiments, the processor 1005 controls the network apparatus 1000 to perform the above-described RAN behaviors. When operating as a RAN node, the processor 1005 may include an application processor (also known as "main processor") which manages application-domain and operating system ("OS") functions and a baseband processor (also known as "baseband radio processor") which manages radio functions.

In various embodiments, the processor 1005 determines a configuration of neighboring cells. In some embodiments, the processor is configured to cause the apparatus to determine the configuration of neighboring cells and the slice information is based on at least one of: A) an OAM configuration, B) self-optimizing network reports from one or more UE, C) an Xn interface between the serving cell and the neighboring cells, or D) a combination thereof.

The processor 1005 determines slice information for a serving cell and the neighboring cells. Here, the slice information includes an identifier of a respective slice group and a set of carrier frequencies corresponding to the respective slice group. In some embodiments, the slice information also includes an absolute priority value for each frequency in the set of carrier frequencies.

Via the transceiver 1025, the processor 1005 broadcasts the slice information (i.e., to one or more UEs) in the serving cell using an indexing scheme to signal at least the set of carrier frequencies. In some embodiments, to broadcast the slice information using the indexing scheme, the processor 1005 uses a predetermined table to indicate at least one of: A) a same/common frequency, B) a slice identifier (e.g., S-NSSAI), C) a slice group identifier, D) a cell identity, or E) a combination thereof. In some embodiments, to broadcast the slice information using the indexing scheme, the processor 1005 points to a first information element when a second information of the same type has the same values for all the subfields and sub-parameters.

In some embodiments, the processor 1005 indicates a list of carrier frequencies. In such embodiments, to indicate the list of carrier frequencies, the processor 1005 may control the transceiver 1025 to broadcast the list of carrier frequencies in a system information block or to transmit the list of carrier frequencies using dedicated Radio Resource Control signaling. In certain embodiments, the indexing scheme includes: an index value of '0' to indicate a carrier frequency of the serving cell, an index value of '1' to indicate a first carrier frequency in the list of carrier frequencies, and an index value of '2' to indicate a second carrier frequency in the list of carrier frequencies.

In some embodiments, to broadcast the slice information using the indexing scheme, the processor 1005 references an index of a predetermined table (e.g., preconfigured or defined in specification) to signal a carrier frequency, where an amount of bits needed to encode the index is less than a number of bits needed to encode the carrier frequency. In certain embodiments, a number of index values in the indexing scheme is greater than a number of entries in the predetermined table, where a particular index value indicates a carrier frequency of the serving cell, and where the carrier frequency of the serving cell is not an entry in the predetermined table.

The memory 1010, in one embodiment, is a computer readable storage medium. In some embodiments, the memory 1010 includes volatile computer storage media. For example, the memory 1010 may include a RAM, including DRAM, SDRAM, and/or SRAM. In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media.

In some embodiments, the memory 1010 stores data related to indicating network slice support for serving and neighbor cells. For example, the memory 1010 may store parameters, configurations, and the like, as described above. In certain embodiments, the memory 1010 also stores program code and related data, such as an operating system or other controller algorithms operating on the network apparatus 1000.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, is designed to output visual, audible, and/or haptic signals. In some embodiments, the output device 1020 includes an electronically controllable display or display device capable of outputting visual data to a user. For example, the output device 1020 may include, but is not limited to, an LCD display, an LED display, an OLED display, a projector, or similar display device capable of outputting images, text, or the like to a user. As another, non-limiting, example, the output device 1020 may include a wearable display separate from, but communicatively coupled to, the rest of the network apparatus 1000, such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 includes at least one transmitter 1030 and at least one receiver 1035. One or more transmitters 1030 may be used to communicate with the UE, as described herein. Similarly, one or more receivers 1035 may be used to communicate with network functions in the PLMN and/or RAN, as described herein. Although only one transmitter 1030 and one receiver 1035 are illustrated, the network apparatus 1000 may have any suitable number of transmitters 1030 and receivers 1035. Further, the transmitter(s) 1030 and the receiver(s) 1035 may be any suitable type of transmitters and receivers.

Figure 11:
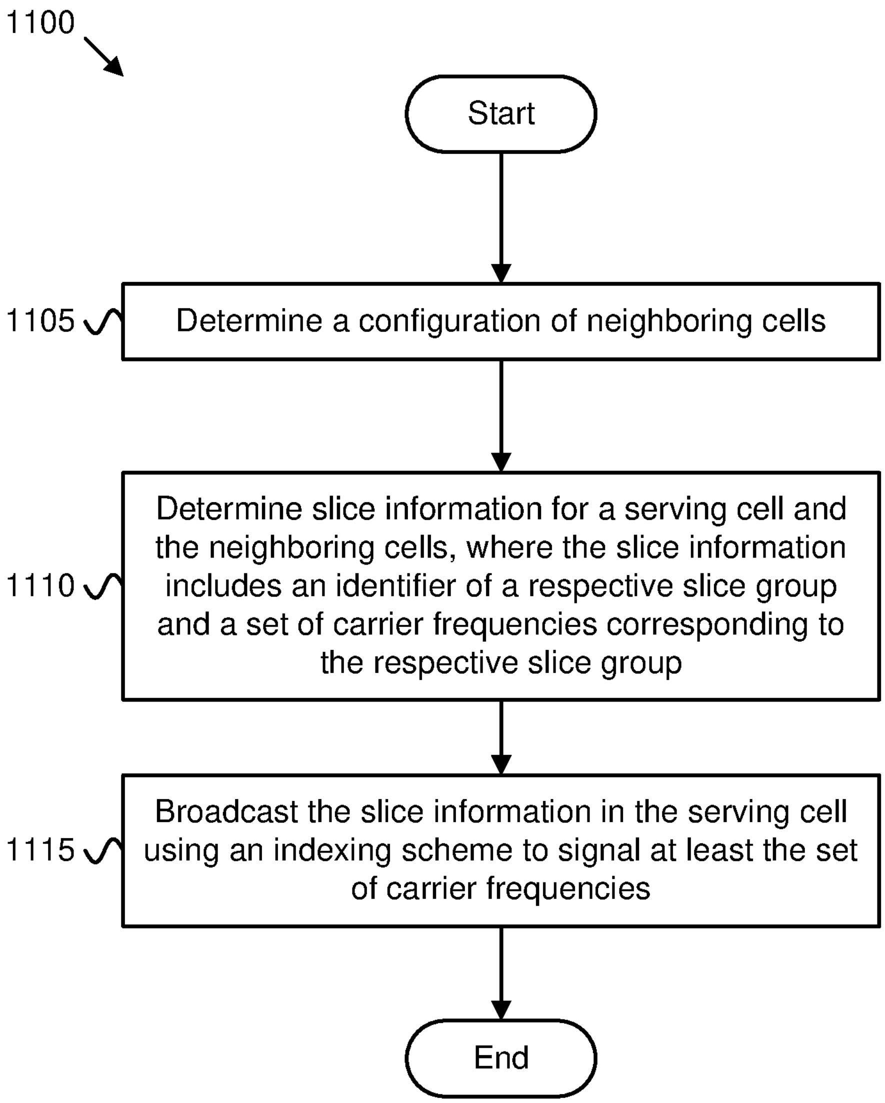
FIG. 11 is a flowchart diagram illustrating one embodiment of a first method for indicating network slice support for serving and neighbor cells.

FIG. 11 depicts one embodiment of a method 1100 for indicating network slice support for serving and neighbor cells, according to embodiments of the disclosure. In various embodiments, the method 1100 is performed by a network device, such as the base unit 121, the RAN node 210, and/or the network apparatus 1000, as described above. In some embodiments, the method 1100 is performed by a processor, such as a microcontroller, a microprocessor, a CPU, a GPU, an auxiliary processing unit, a FPGA, or the like.

The method 1100 includes determining 1105 a configuration of neighboring cells. The method 1100 includes determining 1110 slice information for a serving cell and the neighboring cells, where the slice information includes an identifier of a respective slice group and a set of carrier frequencies corresponding to the respective slice group. The method 1100 includes broadcasting 1115 the slice information (i.e., to one or more UEs) in the serving cell using an indexing scheme to signal at least the set of carrier frequencies. The method 1100 ends.

Figure 12:
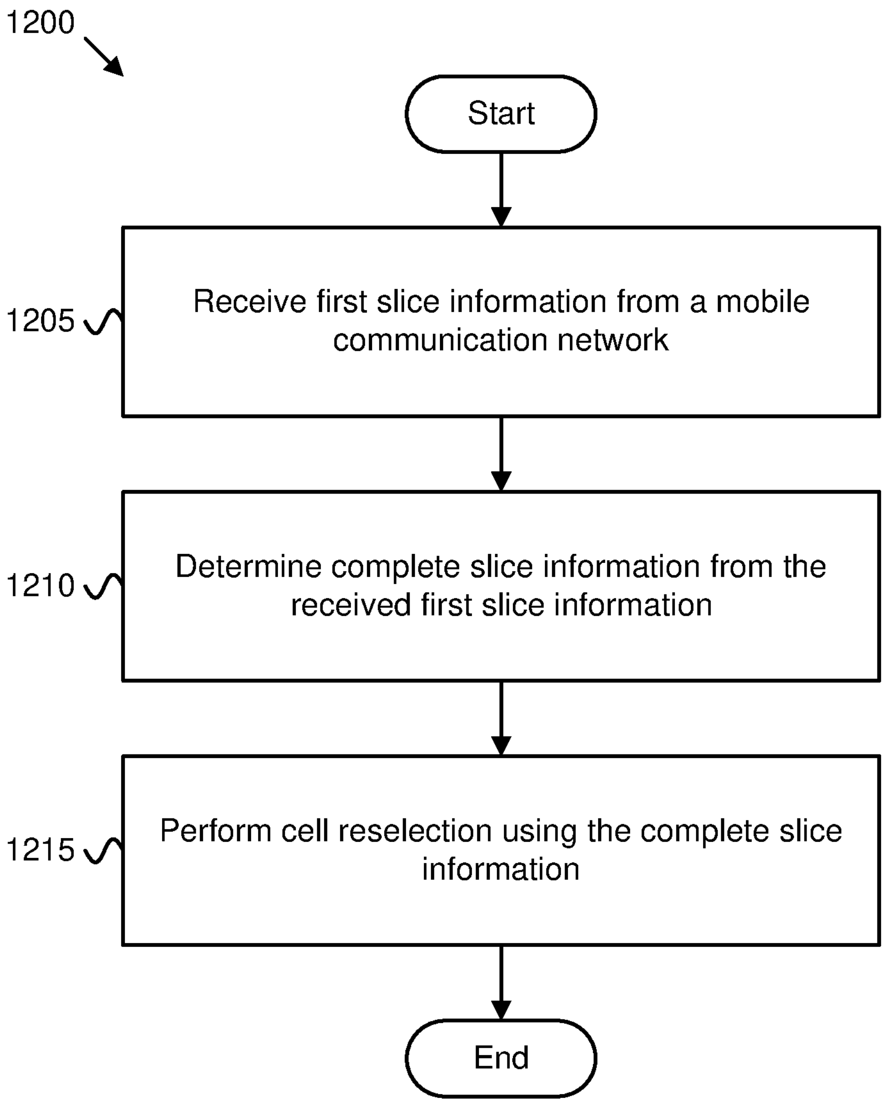
FIG. 12 is a flowchart diagram illustrating one embodiment of a second method for indicating network slice support for serving and neighbor cells.

FIG. 12 depicts one embodiment of a method 1200 for indicating network slice support for serving and neighbor cells, according to embodiments of the disclosure. In various embodiments, the method 1200 is performed by a communication device, such as a remote unit 105, a UE 205, and/or the user equipment apparatus 900, described above. In some embodiments, the method 1200 is performed by a processor, such as a microcontroller, a microprocessor, a CPU, a GPU, an auxiliary processing unit, a FPGA, or the like.

The method 1200 includes receiving 1205 first slice information from a mobile communication network. The method 1200 includes determining 1210 complete slice information from the received first slice information. The method 1200 includes performing 1215 cell reselection (e.g., RRC Idle cell reselection and/or RRC Inactive cell reselection) using the complete slice information. The method 1200 ends.

Disclosed herein is a first apparatus for indicating network slice support for serving and neighbor cells, according to embodiments of the disclosure. The first apparatus may be implemented by a network device, such as the base unit 121, the RAN node 210, and/or the network apparatus 1000, as described above. The first apparatus includes a processor coupled to a memory, the processor configured to cause the apparatus to: A) determine a configuration of neighboring cells: B) determine slice information for a serving cell and the neighboring cells, where the slice information includes an identifier of a respective slice group and a set of carrier frequencies corresponding to the respective slice group; and C) broadcast the slice information (i.e., to one or more UEs) in the serving cell using an indexing scheme to signal at least the set of carrier frequencies.

In some embodiments, the slice information includes an absolute priority value for each frequency in the set of carrier frequencies. In some embodiments, the processor is configured to cause the apparatus to determine the configuration of neighboring cells and the slice information is based on at least one of: A) an OAM configuration, B) self-optimizing network reports from one or more UE, C) an Xn interface between the serving cell and the neighboring cells, or D) a combination thereof.

In some embodiments, the processor is further configured to cause the apparatus to indicate a list of carrier frequencies, where the indexing scheme includes: an index value of '0' to indicate a carrier frequency of the serving cell, an index value of '1' to indicate a first carrier frequency in the list of carrier frequencies, and an index value of '2' to indicate a second carrier frequency in the list of carrier frequencies. In such embodiments, to indicate the list of carrier frequencies, the processor may be configured to cause the apparatus to broadcast the list of carrier frequencies in a system information block or to transmit the list of carrier frequencies using dedicated Radio Resource Control signaling.

In some embodiments, to broadcast the slice information using the indexing scheme, the processor is configured to cause the apparatus to reference an index of a predetermined table (e.g., preconfigured or defined in specification) to signal a carrier frequency, where an amount of bits needed to encode the index is less than a number of bits needed to encode the carrier frequency. In certain embodiments, a number of index values in the indexing scheme is greater than a number of entries in the predetermined table, where a particular index value indicates a carrier frequency of the serving cell, and where the carrier frequency of the serving cell is not an entry in the predetermined table.

In some embodiments, to broadcast the slice information using the indexing scheme, the processor is configured to cause the apparatus to use a predetermined table to indicate at least one of: A) a same/common frequency, B) a slice identifier (e.g., S-NSSAI), C) a slice group identifier, D) a cell identity, or E) a combination thereof. In some embodiments, to broadcast the slice information using the indexing scheme, the processor is configured to cause the apparatus to point to a first information element when a second information of the same type has the same values for all the subfields and sub-parameters.

Disclosed herein is a first method for indicating network slice support for serving and neighbor cells, according to embodiments of the disclosure. The first method may be performed by a network device, such as the base unit 121, the RAN node 210, and/or the network apparatus 1000, as described above. The first method includes determining a configuration of neighboring cells and determining slice information for a serving cell and the neighboring cells, where the slice information includes an identifier of a respective slice group and a set of carrier frequencies corresponding to the respective slice group. The first method includes broadcasting the slice information (i.e., to one or more UEs) in the serving cell using an indexing scheme to signal at least the set of carrier frequencies.

In some embodiments, the slice information includes an absolute priority value for each frequency in the set of carrier frequencies. In some embodiments, determining the configuration of neighboring cells and the slice information is based on at least one of: A) an OAM configuration, B) self-optimizing network reports from one or more UE, C) an Xn interface between the serving cell and the neighboring cells, or D) a combination thereof.

In some embodiments, the first method further includes indicating a list of carrier frequencies, where the indexing scheme includes: an index value of '0' to indicate a carrier frequency of the serving cell, an index value of '1' to indicate a first carrier frequency in the list of carrier frequencies, and an index value of '2' to indicate a second carrier frequency in the list of carrier frequencies. In certain embodiments, the list of carrier frequencies is broadcast in a system information block or is transmitted using dedicated Radio Resource Control signaling.

In some embodiments, to broadcast the slice information using the indexing scheme, the processor is configured to cause the apparatus to reference an index of a predetermined table (e.g., preconfigured or defined in specification) to signal a carrier frequency, where an amount of bits needed to encode the index is less than a number of bits needed to encode the carrier frequency. In certain embodiments, a number of index values in the indexing scheme is greater than a number of entries in the predetermined table, where a particular index value indicates a carrier frequency of the serving cell, and where the carrier frequency of the serving cell is not an entry in the predetermined table.

In some embodiments, to broadcast the slice information using the indexing scheme, the processor is configured to cause the apparatus to use a predetermined table to indicate: A) a same/common frequency, B) a slice identifier (e.g., S-NSSAI), C) a slice group identifier, D) a cell identity, or E) a combination thereof. In some embodiments, to broadcast the slice information using the indexing scheme, the processor is configured to cause the apparatus to point to a first information element when a second information of the same type has the same values for all the subfields and sub-parameters.

Disclosed herein is a second apparatus for indicating network slice support for serving and neighbor cells, according to embodiments of the disclosure. The second apparatus may be implemented by a communication device, such as a remote unit 105, a UE 205, and/or the user equipment apparatus 900, described above. The second apparatus includes a memory and a processor coupled to the memory, the processor configured to cause the apparatus to: A) receive first (i.e., preliminary) slice information from a mobile communication network: B) determine complete (i.e., second) slice information from the received first slice information; and C) perform cell reselection (i.e., RRC Idle cell reselection and/or RRC Inactive cell reselection) using the complete slice information.

In some embodiments, to receive the first slice information, the processor is configured to cause the apparatus to receive a system information block or dedicated RRC signaling including the first slice information. In such embodiments, the first slice information includes an identifier of a respective slice group and a set of carrier frequencies corresponding to the respective slice group, where the system information block or dedicated RRC signaling uses an indexing scheme to indicate at least the set of carrier frequencies. In certain embodiments, the first slice information further includes an absolute priority value for each frequency in the set of carrier frequencies.

In some embodiments, the processor is further configured to cause the apparatus to receive a list of carrier frequencies, where the indexing scheme includes: an index value of '0' to indicate a carrier frequency of the serving cell, an index value of '1' to indicate a first carrier frequency in the list of carrier frequencies, and an index value of '2' to indicate a second carrier frequency in the list of carrier frequencies. In certain embodiments, to receive the list of carrier frequencies, the processor is configured to cause the apparatus to receive a system information block or dedicated Radio Resource Control signaling.

In some embodiments, to receive the first slice information indicated using the indexing scheme, the processor is configured to cause the apparatus to reference an index of a predetermined table (e.g., preconfigured or defined in specification) to signal a carrier frequency, where an amount of bits needed to encode the index is less than a number of bits needed to encode the carrier frequency. In certain embodiments, a number of index values in the indexing scheme is greater than a number of entries in the predetermined table, where a particular index value indicates a carrier frequency of the serving cell, and where the carrier frequency of the serving cell is not an entry in the predetermined table.

In some embodiments, to receive the first slice information indicated using the indexing scheme, the processor is configured to cause the apparatus to use a predetermined table to determine at least one of: A) a same/common frequency, B) a slice identifier (i.e., S-NSSAI), C) a slice group identifier, D) a cell identity, or E) a combination thereof. In certain embodiments, to receive the first slice information indicated using the indexing scheme, the processor is configured to cause the apparatus to: A) point to a first information element when a second information of the same type has the same values for all the subfields and sub-parameters; and B) replace a value for the second information with an actual value of the first information element.

In some embodiments, to determine the complete slice information from the received first slice information, the processor is configured to cause the apparatus to: A) index the first occurrence of first new value for a particular information element type, indexing starting from integer value '0' or '1', and B) store the index mapping to the actual value of a complete slice information element.

In some embodiments, to determine the complete slice information from the received first slice information, the processor is configured to cause the apparatus to: A) increment an index for first occurrence of next new value for a particular information element type, and B) store the index mapping to the actual value of the information element. In some embodiments, to determine the complete slice information from the received first slice information, the processor is configured to cause the apparatus to replace a pointer value for a particular information element with an actual value of the information values pointed to.

Disclosed herein is a second method for indicating network slice support for serving and neighbor cells, according to embodiments of the disclosure. The second method may be performed by a communication device, such as a remote unit 105, a UE 205, and/or the user equipment apparatus 900, described above. The second method includes receiving first (i.e., preliminary) slice information from a mobile communication network and determining complete (i.e., second) slice information from the received first slice information. The second method includes performing cell reselection (e.g., RRC Idle cell reselection and/or RRC Inactive cell reselection) using the complete slice information.

In some embodiments, receiving the first slice information includes receiving a system information block or dedicated RRC signaling including the first slice information. In some embodiments, the first slice information includes an identifier of a respective slice group and a set of carrier frequencies corresponding to the respective slice group, where the system information block or dedicated RRC signaling uses an indexing scheme to indicate at least the set of carrier frequencies. In certain embodiments, the first slice information further includes an absolute priority value for each frequency in the set of carrier frequencies.

In some embodiments, the second method further includes receiving a list of carrier frequencies, where the indexing scheme includes: an index value of '0' to indicate a carrier frequency of the serving cell, an index value of '1' to indicate a first carrier frequency in the list of carrier frequencies, and an index value of '2' to indicate a second carrier frequency in the list of carrier frequencies. In certain embodiments, the list of carrier frequencies is received a system information block or dedicated Radio Resource Control signaling. The list of carrier frequencies is broadcast in a system information block or is transmitted using dedicated Radio Resource Control signaling.

In some embodiments, receiving the first slice information indicated using the indexing scheme includes referencing an index of a predetermined table (e.g., preconfigured or defined in specification) to signal a carrier frequency, where an amount of bits needed to encode the index is less than a number of bits needed to encode the carrier frequency. In certain embodiments, a number of index values in the indexing scheme is greater than a number of entries in the predetermined table, where a particular index value indicates a carrier frequency of the serving cell, and where the carrier frequency of the serving cell is not an entry in the predetermined table.

In some embodiments, receiving the first slice information indicated using the indexing scheme includes using a predetermined table to determine at least one of: A) a same/common frequency, B) a slice identifier (i.e., S-NSSAI), C) a slice group identifier, D) a cell identity, or E) a combination thereof. In certain embodiments, receiving the first slice information indicated using the indexing scheme includes A) pointing to a first information element when a second information of the same type has the same values for all the subfields and sub-parameters, and B) replacing a value for the second information with an actual value of the first information element.

In some embodiments, determining the complete slice information from the received first slice information includes A) indexing the first occurrence of first new value for a particular information element type, indexing starting from integer value '0' or '1', and B) storing the index mapping to the actual value of a complete slice information element.

In some embodiments, determining the complete slice information from the received first slice information includes A) incrementing an index for first occurrence of next new value for a particular information element type, and B) storing the index mapping to the actual value of the information element. In some embodiments, determining the complete slice information from the received first slice information includes replacing a pointer value for a particular information element with an actual value of the information values pointed to.

Disclosed herein is a system for indicating network slice support for serving and neighbor cells, according to embodiments of the disclosure. The system includes a RAN node and at least one UE. The RAN node is configured to determine a configuration of neighboring cells and determine first slice information for a serving cell and the neighboring cells, where the first slice information includes an identifier of a respective slice group and a set of carrier frequencies corresponding to the respective slice group. The RAN node is further configured to broadcasting the first slice information in the serving cell using an indexing scheme to signal at least the set of carrier frequencies, while each UE is configured to receive the first (i.e., preliminary) slice information from the RAN node. Each UE is further configured to determine complete slice information from the broadcast first slice information and perform cell reselection (i.e., RRC Idle cell reselection and/or RRC Inactive cell reselection) using the complete slice information.

In some embodiments, the RAN node is configured to determine the configuration of neighboring cells and the slice information based on at least one of: A) an OAM configuration, B) self-optimizing network reports from one or more UEs, C) an Xn interface between the serving cell and the neighboring cells, or D) a combination thereof. In some embodiments, the first slice information further includes an absolute priority value for each frequency in the set of carrier frequencies.

In some embodiments, the RAN node is configured to indicate a list of carrier frequencies to the UE, where the indexing scheme includes an index value of '0' to indicate a carrier frequency of the serving cell, an index value of '1' to indicate a first carrier frequency in the list of carrier frequencies, and an index value of '2' to indicate a second carrier frequency in the list of carrier frequencies. In certain embodiments, the RAN node is configured to broadcast the list of carrier frequencies in a system information block or to transmit the list of carrier frequencies using dedicated Radio Resource Control signaling.

In some embodiments, to broadcast the slice information using the indexing scheme, the RAN node is configured to reference an index of a predetermined table (e.g., preconfigured or defined in specification) to signal a carrier frequency, where an amount of bits needed to encode the index is less than a number of bits needed to encode the carrier frequency. In certain embodiments, a number of index values in the indexing scheme is greater than a number of entries in the predetermined table, where a particular index value indicates a carrier frequency of the serving cell, and where the carrier frequency of the serving cell is not an entry in the predetermined table.

In some embodiments, to broadcast the slice information using the indexing scheme, the RAN node is configured to use a predetermined table to indicate at least one of: A) a same/common frequency, B) a slice identifier (i.e., S-NSSAI), C) a slice group identifier, D) a cell identity, or E) a combination thereof. In some embodiments, to broadcast the slice information using the indexing scheme, the RAN node is configured point to a first information element when a second information of the same type has the same values for all the subfields and sub-parameters.

In some embodiments, to receive the broadcast first slice information, the UE is configured to receive a system information block including the first slice information. In some embodiments, to determine the complete slice information from the received information the UE is configured to replace a pointer value for a particular information element with an actual value of the information values pointed to.

In some embodiments, to determine the complete slice information from the received first slice information, the UE is configured to: A) index the first occurrence of first new value for a particular information element type, indexing starting from integer value '0' or '1'; and B) store the index mapping to the actual value of a complete slice information element.

In some embodiments, to determine the complete slice information from the received first slice information, the UE is configured to: A) increment an index for first occurrence of next new value for a particular information element type, and B) store the index mapping to the actual value of the information element.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A base station for wireless communication, comprising:

a processor; and a memory coupled to the processor, the processor configured to cause the base station to:

determine a configuration of neighboring cells;

determine slice information for a serving cell and the neighboring cells, wherein the slice information comprises an identifier of a respective slice group and a set of carrier frequencies corresponding to the respective slice group; and broadcast the slice information in the serving cell using an indexing scheme to signal at least the set of carrier frequencies, wherein the indexing scheme comprises: an index value of '0' to indicate a carrier frequency of the serving cell, an index value of '1' to indicate a first carrier frequency in a list of carrier frequencies, and an index value of '2' to indicate a second carrier frequency in the list of carrier frequencies, and wherein the list of carrier frequencies is broadcasted in a system information block (SIB) or transmitted in a dedicated Radio Resource Control (RRC) signaling.

2. The base station of claim 1, wherein the slice information comprises an absolute priority value for each frequency in the set of carrier frequencies.

3. The base station of claim 1, wherein to broadcast the slice information using the indexing scheme, the processor is configured to cause the base station to reference an index of a predetermined table to signal a carrier frequency, wherein an amount of bits needed to encode the index is less than a number of bits needed to encode the carrier frequency.

4. The base station of claim 3, wherein a number of index values in the indexing scheme is greater than a number of entries in the predetermined table, wherein a particular index value indicates a carrier frequency of the serving cell, and wherein the carrier frequency of the serving cell is not an entry in the predetermined table.

5. The base station of claim 1, wherein to broadcast the slice information using the indexing scheme, the processor is configured to cause the base station to use a predetermined table to indicate:

a same/common frequency, a slice identifier, a slice group identifier, a cell identity, or a combination thereof.

6. A user equipment for wireless communication, comprising:

a processor; and a memory coupled to the processor, the processor configured to cause the UE to:

receive first slice information using an indexing scheme, wherein the first slice information is received in a system information block (SIB) or a dedicated radio resource control (RRC) signaling comprising an identifier of a respective slice group and a set of carrier frequencies corresponding to the respective slice group, wherein the SIB or the dedicated RRC signaling uses the indexing scheme to indicate at least the set of carrier frequencies, and wherein the indexing scheme comprises: an index value of '0' to indicate a carrier frequency of a serving cell, an index value of '1' to indicate a first carrier frequency in a list of carrier frequencies, and an index value of '2' to indicate a second carrier frequency in the list of carrier frequencies;

determine complete slice information from the received first slice information; and perform cell reselection using the complete slice information.

7. The UE of claim 6, wherein to determine the complete slice information from the received first slice information, the processor is configured to cause the UE to:

index a first occurrence of first new value for a particular information element type, indexing starting from integer value '0' or '1'; and store an index mapping to an actual value of a complete slice information element.

8. The UE of claim 6, wherein to determine the complete slice information from the received first slice information, the processor is configured to cause the UE to:

increment an index for first occurrence of next new value for a particular information element type, and store an index mapping to an actual value of each respective information element.

9. The UE of claim 6, wherein to determine the complete slice information from the received first slice information, the processor is configured to cause the UE to replace a pointer value for a particular information element with an actual value of the information values pointed to.

10. A system comprising:

a base station configured to:

determine a configuration of neighboring cells;

determine first slice information for a serving cell and the neighboring cells, wherein the first slice information comprises an identifier of a respective slice group and a set of carrier frequencies corresponding to the respective slice group; and broadcast the first slice information in the serving cell using an indexing scheme to signal at least the set of carrier frequencies, wherein the indexing scheme comprises: an index value of '0' to indicate a carrier frequency of the serving cell, an index value of '1' to indicate a first carrier frequency in a list of carrier frequencies, and an index value of '2' to indicate a second carrier frequency in the list of carrier frequencies, and wherein the list of carrier frequencies is broadcasted in a system information block (SIB) or transmitted in a dedicated Radio Resource Control (RRC) signaling; and a user equipment (UE) configured to:

receive the first slice information;

determine complete slice information from the first slice information; and perform cell reselection using the complete slice information.

11. The system of claim 10, wherein the slice information comprises an absolute priority value for each frequency in the set of carrier frequencies.

12. The system of claim 10, wherein to broadcast the slice information using the indexing scheme, the base station references an index of a predetermined table to signal a carrier frequency, wherein an amount of bits needed to encode the index is less than a number of bits needed to encode the carrier frequency.

13. The system of claim 12, wherein a number of index values in the indexing scheme is greater than a number of entries in the predetermined table, wherein a particular index value indicates a carrier frequency of the serving cell, and wherein the carrier frequency of the serving cell is not an entry in the predetermined table.

14. The system of claim 10, wherein to broadcast the slice information using the indexing scheme, the base station is configured to use a predetermined table to indicate:

a same/common frequency, a slice identifier, a slice group identifier, a cell identity, or a combination thereof.

15. The system of claim 10, wherein to determine the complete slice information from the first slice information, the UE is configured to:

index a first occurrence of first new value for a particular information element type, indexing starting from integer value '0' or '1'; and store an index mapping to an actual value of a complete slice information element.

16. The system of claim 10, wherein to determine the complete slice information from the first slice information, the UE is configured to:

increment an index for first occurrence of next new value for a particular information element type, and store an index mapping to an actual value of each respective information element.

17. The system of claim 10, wherein to determine the complete slice information from the first slice information, the UE is configured to replace a pointer value for a particular information element with an actual value of the information values pointed to.

18. The UE of claim 6, wherein the received first slice information comprises a reference to an index of a predetermined table, wherein the index of the predetermined table indicates a carrier frequency, and wherein an amount of bits needed to encode the index is less than a number of bits needed to encode the carrier frequency.

19. The UE of claim 18, wherein a number of index values in the indexing scheme is greater than a number of entries in the predetermined table, wherein a particular index value indicates a carrier frequency of the serving cell, and wherein the carrier frequency of the serving cell is not an entry in the predetermined table.

* * * * *